(12) United States Patent
Imanaka et al.

(10) Patent No.: US 6,282,669 B1
(45) Date of Patent: Aug. 28, 2001

(54) ETHERNET COMMUNICATION REDUNDANCY METHOD

(75) Inventors: Toru Imanaka; Yumiko Otsuka, both of Tokyo (JP)

(73) Assignee: Yamatake-Honeywell Co., Ltd., Tokyo (JP)

( * ) Notice: Subject to any disclaimer, the term of this patent is extended or adjusted under 35 U.S.C. 154(b) by 0 days.

(21) Appl. No.: 09/004,945

(22) Filed: Jan. 9, 1998

(30) Foreign Application Priority Data

Jan. 16, 1997 (JP) ................................................. 9-005344

(51) Int. Cl.⁷ ................................. H04L 1/22; H04J 1/16
(52) U.S. Cl. ..................................... 714/4; 714/6; 714/11; 714/712; 370/221; 370/224; 370/225; 370/255; 370/360; 370/394
(58) Field of Search ............................ 714/11, 4, 6, 712; 370/255, 224, 221, 394, 360, 225

(56) References Cited

U.S. PATENT DOCUMENTS

| | | | |
|---|---|---|---|
| 5,379,278 | * 1/1995 | Safadi | 370/221 |
| 5,404,465 | * 4/1995 | Novakovich et al. | 710/110 |
| 5,740,158 | * 4/1998 | Aoki et al. | 370/224 |
| 5,805,578 | * 9/1998 | Stirpe et al. | 370/255 |

FOREIGN PATENT DOCUMENTS

| | | | |
|---|---|---|---|
| 04144445 A | 5/1992 | (JP) | H04L/12/40 |
| 04278751 A | 10/1992 | (JP) | H04L/29/00 |

* cited by examiner

*Primary Examiner*—Rupal Dharia
(74) *Attorney, Agent, or Firm*—Blakely Sokoloff Taylor & Zafman

(57) ABSTRACT

In a redundancy method for Ethernet communication between a plurality of nodes constituting a distributed control system, the nodes are connected to each other in a duplex state through first and second Ethernet communication lines which are independent of each other. A node on the transmission side transmits identical data to both the first and second Ethernet communication lines. A node on the reception side determines one of the identical data received from the node on the transmission side through the first and second Ethernet communication lines which has arrived first as reception data.

6 Claims, 5 Drawing Sheets

ETHERNET COMMUNICATION REDUNDANCY METHOD

BACKGROUND OF THE INVENTION

The present invention relates to an Ethernet communication redundancy method and, more particularly, to an Ethernet communication redundancy method of making a communication system redundant between a plurality of nodes connected to each other through Ethernet communication lines to constitute a distributed control system.

In general, in a distributed control system (DCS) for controlling each node to be controlled by using a corresponding one of a plurality of nodes (terminals), a communication system for connecting the respective nodes is made redundant to increase the operation rate of the overall system, thereby efficiently controlling the system. When a communication scheme using a token, e.g., token passing, is used as a communication scheme between the respective nodes, since the cyclic period of the token can be calculated, disconnection in the communication system or the like can be detected by checking this cyclic cycle.

Assume that a communication scheme using such a token is used as the communication system of a distributed control system. In this case, a system and method which switch redundant systems for communication in response to disconnection or a communication failure in this communication system as a trigger are conceivable.

As personal computers become widespread and improve in performance, personal computers connected as nodes through Ethernet are now in increasing demand. The communication system of a distributed control system may therefore be made redundant by using Ethernet widely used in the field of personal computers.

In such a conventional redundancy method, however, when one Ethernet communication line is used for a communication system, since the communication line is shared by a plurality of nodes, the time taken for communication greatly varies due to contention control and the like. For this reason, this method cannot be used for a distributed control system which is required to exchange measurement data and control commands without any great delay.

For example, in Ethernet, CSMA/CD (Carrier Sense Multiple Access with Collision Detection) is used as a contention control method. According to this method, when one communication line is shared by a plurality of nodes, data is transmitted to the communication line after it is determined that the communication line is not in use. If, therefore, different nodes simultaneously start transmitting data, a collision occurs.

The probability of occurrence of collision increases as the number of nodes and the communication frequency increase. When a collision occurs, retry is performed (for example, 16 times=several hundred ms on the MAC layer). In this case, the time required for communication greatly varies. This method cannot therefore be used for process control that is required to exchange measurement data and control commands without any great delay.

In a redundancy scheme designed to switch communication lines, when a failure occurs in one of the communication lines, the failed communication line must be repaired while communication is performed exclusively through the normal communication line.

SUMMARY OF THE INVENTION

It is an object of the present invention to provide an Ethernet communication redundancy method which can exchange measurement data and control commands without any great delay.

It is another object of the present invention to provide an Ethernet communication redundancy method which need not switch communication lines.

In order to achieve the above objects, according to the present invention, there is provided a redundancy method for Ethernet communication between a plurality of nodes constituting a distributed control system, comprising the steps of connecting said nodes to each other in a duplex state through first and second Ethernet communication lines which are independent of each other, causing a node on a transmission side to transmit identical data to both the first and second Ethernet communication lines, and causing a node on a reception side to determine one of the identical data received from the node on the transmission side through the first and second Ethernet communication lines which has arrived first as reception data.

DESCRIPTION OF THE PREFERRED EMBODIMENTS

The present invention will be described in detail below with reference to the accompanying drawings.

Figure 1:
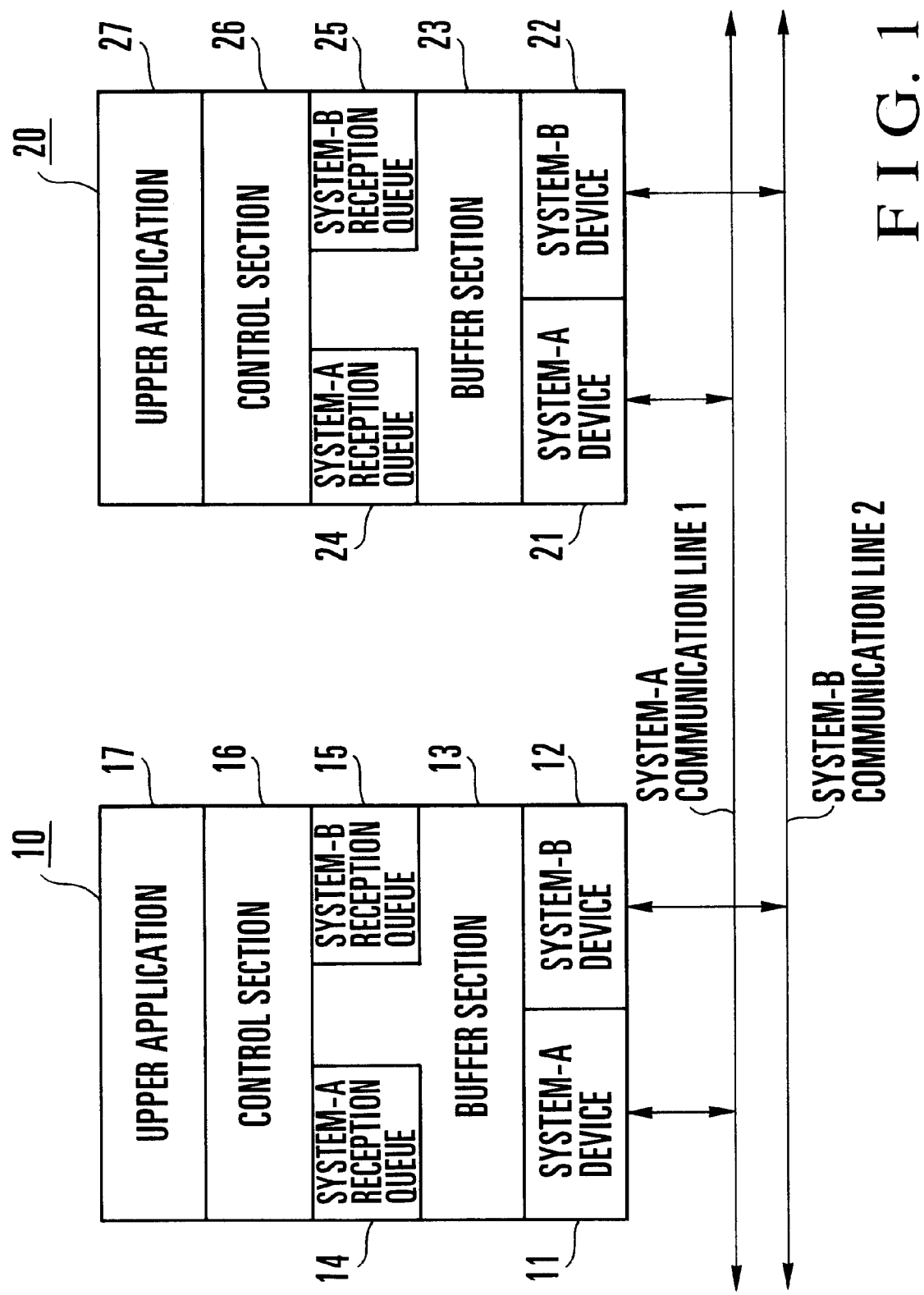
FIG. 1 is a block diagram showing a distributed control system using Ethernet communication according to the first embodiment of the present invention.

FIG. 1 shows a distributed control system using Ethernet communication according to an embodiment of the present invention. Referring to FIG. 1, a system-A communication line 1 and a system-B communication line 2 are communication lines used to perform Ethernet communication between a plurality of nodes such as nodes 10 and 20. With this arrangement, communication to be performed between the respective nodes is duplexed.

The nodes 10 and 20 are respectively constituted by system-A devices 11 and 21 serving as interfaces for exchanging data through the system-A communication line 1, system-B devices 12 and 22 serving as interfaces for exchanging data through the system-B communication line 2, buffer sections 13 and 23 for temporarily storing data to be transmitted/received, system-A reception queues 14 and 24 for storing pieces of information for the management of the data received through the system-A communication line 1, system-B reception queues 15 and 25 for storing pieces of information for the management of the data received through the system-B communication line 2, and control sections 16 and 26 for controlling data transmission/reception processing in accordance with commands from upper applications 17 and 27.

Data transmission from the node 10 to the node will be described next with reference to FIGS. 3 and 4.

Figure 3:
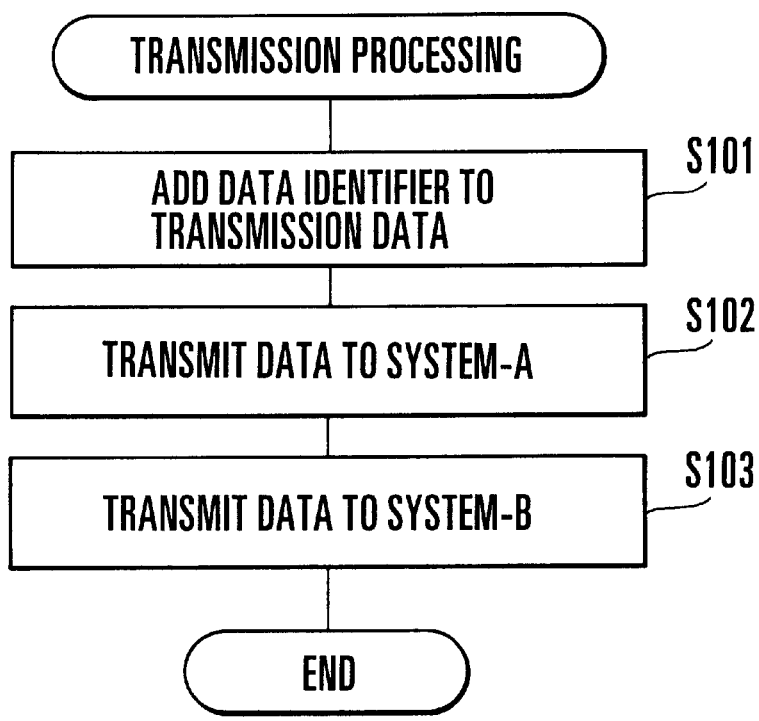
FIG. 3 is a flow chart showing transmission processing in the system in FIG. 1.

The control section 16 of the node 10 on the transmission side starts the transmission processing shown in FIG. 3 in accordance with a transmission command from the upper application 17. First of all, the control section 16 adds a data identifier for identifying transmission data to the transmission data received from the upper application 17 (step S101).

Figure 2:
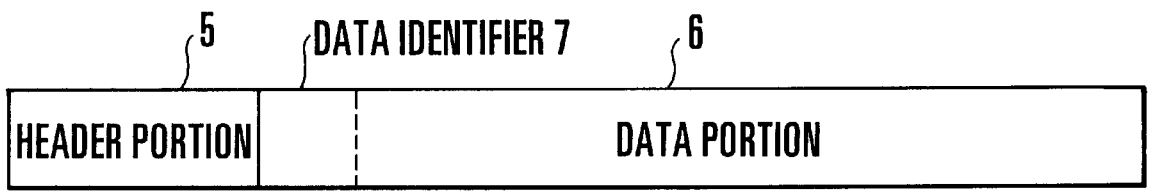
FIG. 2 is a view for explaining the format of transmission data which is used in the system in FIG. 1.

In this case, as shown in FIG. 2, the transmission data includes a header portion 5 in which various pieces of control information used for Ethernet are stored, a data portion 6 as the essential transmission data to be transmitted, and a data identifier 7 for identifying the contents of the data portion 6. In the header portion 5, for example, addresses indicating source and destination nodes are stored by the system-A device 11 and the system-B device 12.

In the data portion 6, data obtained by adding the data identifier 7 to the data received from the upper application 17 is stored by the control section 16. As this data identifier 7, a unique value in an interval sufficiently longer than the interval between the instant at which the identifier is added and the instant at which reception processing is performed in the node on the reception side is used in consideration of various types of transmission delays. In practice, as the data identifier 7, one of consecutive sequence numbers circulating with a length that satisfies the requirement for the above interval when data are transmitted at the shortest data transmission intervals, or a combination of such a sequence number and information indicating the node on the transmission side is used.

The transmission data generated in this manner is stored in each of predetermined transmission areas in the buffer section 13 which are arranged in correspondence with the system-A device 11 and the system-B device 12. The system-A device 11 and the system-B device 12 respectively check the corresponding predetermined transmission areas in the buffer section 13 at a predetermined timing. When the transmission data are stored in the buffer section 13, the system-A device 11 and the system-B device 12 add the header portions 5 to the data, and transmit the resultant data upon checking whether the system-A communication line 1 and the system-B communication line 2 are available (steps S102 and S103). With this operation, the transmission data from the upper application 17 are concurrently transmitted from the node 10 to both the system-A communication line 1 and the system-B communication line 2.

Figure 4:
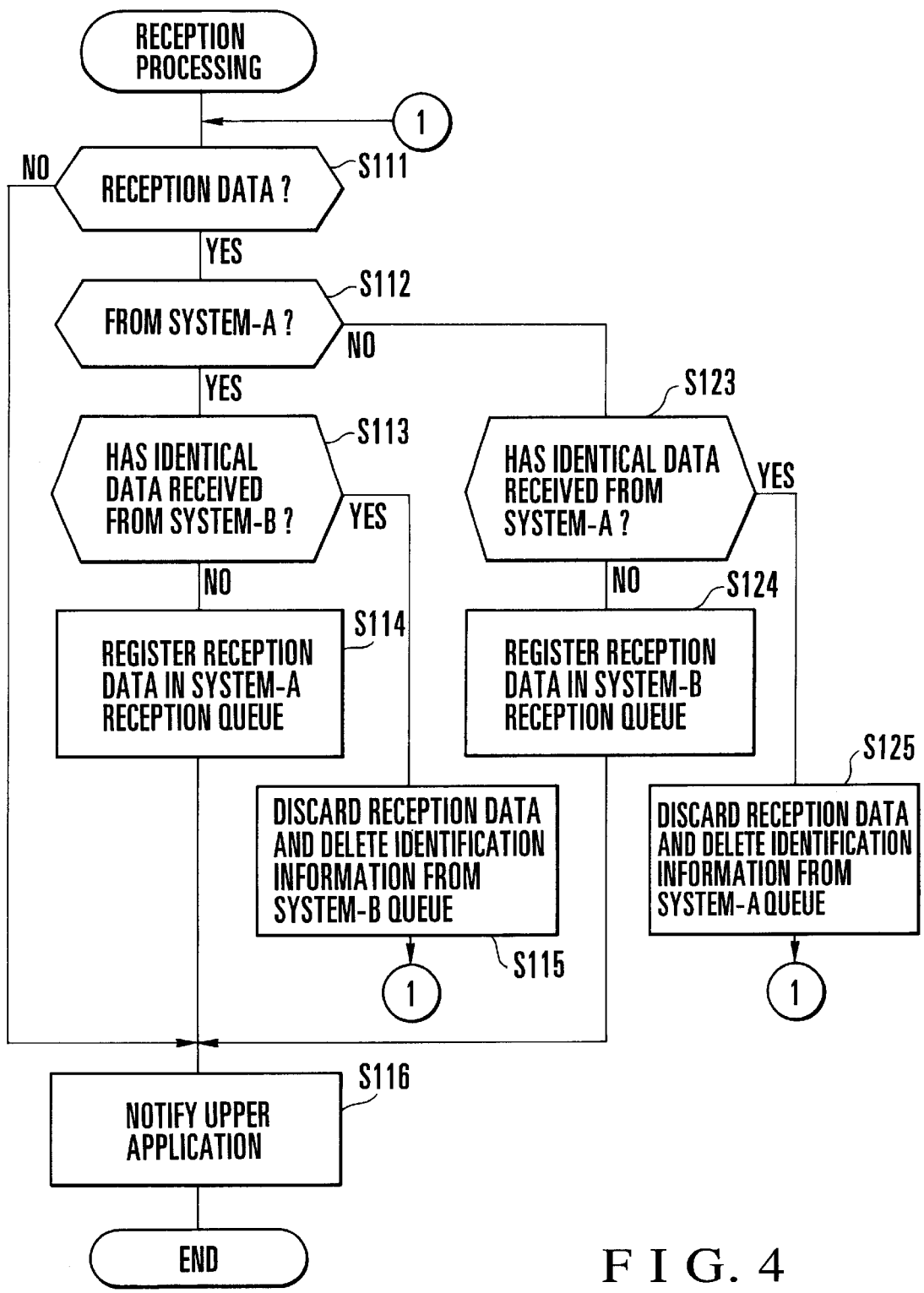
FIG. 4 is a flow chart showing reception processing in the system in FIG. 1.

The control section 26 of the node 20 on the reception side starts the reception processing shown in FIG. 4 in accordance with a reception command from the upper application 27. First of all, the control section 26 checks whether reception data are stored in, predetermined reception areas in the buffer section 23 (step S111). Note that the buffer section 23 has independent reception areas for temporarily storing reception data in correspondence with the system-A device 21 and the system-B device 22.

The system-A device 21 and the system-B device 22 always check the header portions 5 of data flowing in the system-A communication line 1 and the system-B communication line 2. Each device receives transmission data addressed thereto and stores it in the corresponding reception area in the buffer section 23.

As described above, the control section 26 checks the respective reception areas in the buffer section 23 which correspond to the system-A device 21 and the system-B device 22 in step S111. If reception data is stored in none of the reception areas, the control section 26 notifies the upper application 27 of the corresponding information (step S116), and terminates the reception processing.

If reception data is stored in any of the reception areas in the buffer section 23, the control section 26 checks whether the reception data is stored in the reception area corresponding to the system-A device 21 or the system-B device 22 (step S112). If the reception data is stored in the reception area corresponding to the system-A device 21, i.e., the reception data is received from the system-A communication line 1, the control section 26 checks whether data identical to the reception data has already been received from the system-B communication line 2 (step S113).

Whether data identical to the reception data has already been received, i.e., whether the received data is the first reception data of the identical data concurrently transmitted to the system-A communication line 1 and the system-B communication line 2, is determined by referring to a reception queue in the other system.

In the system-A reception queue 24 and the system-B reception queue 25, pieces of identification information indicating received data, e.g., the data identifiers 7 in FIG. 2 which were added to the transmission data when they were transmitted, are registered. In step S113, therefore, the control section 26 refers to the system-B reception queue 25 to check whether there is identification information indicating data identical to the reception data. If the identical reception data has not been received, the identification information indicating the reception data is registered in the system-A reception queue 24 (step S114).

Subsequently, the control section 26 notifies the upper application 27 of the reception data (step S116), and terminates the reception processing.

If it is determined in step S113 that identical reception data has already been received, the system-A reception data received later is discarded, and the identification information indicating data identical to the A-system reception data is deleted from the system-B reception queue 25 (step S115). Thereafter, the flow returns to step S111 to check the presence/absence of reception data.

If it is determined in step S112 that reception data is stored in the reception area corresponding to the system-B device 22, i.e., reception data is received from the system-B communication line 2, the control section 26 refers to the system-A reception queue 24 to check whether data identical to the reception data has already been received from the system-A communication line 1 (step S123). If no data identical to the reception data has been received, identification information indicating the reception data is registered in the system-B reception queue 25 (step S124).

After this operation, the control section 26 notifies the upper application 27 of the reception data (step S116), and terminates the reception processing.

If it is determined in step S123 that identical reception data has already been received, the system-B reception data received later is discarded, and identification information indicating data identical to the system-B reception data is deleted from the system-A reception queue 24 (step S125). The flow then returns to step S111 to check the presence/absence of reception data.

According to this embodiment, the respective nodes are connected through the two Ethernet communication lines, i.e., the system-A communication line 1 and the system-B communication line 2. The node 10 on the transmission side concurrently transmits transmission data to the system-A communication line 1 and the system-B communication line 2. The node 20 on the reception side checks whether data identical to the reception data received from one of the system-A communication line 1 and the system-B communication line 2 has already been received from the other communication line, i.e., the reception data is the first data. If no identical data has been received, the upper application is notified of the reception data. If identical reception data has been received, the data is discarded. With this operation, variations in the time required for communication due to collisions can be reduced, and measurement data and control commands can be exchanged without any great delay as compared with the communication system using one Ethernet communication line.

The node 10 on the transmission side transmits transmission data upon adding a data identifier for identifying the transmission data. The node 20 on the reception side checks on the basis of the data identifier added to the reception data whether data identical to the reception data has already been received. With this operation, the presence/absence of identical data can be accurately determined. This system is therefore optimal for process control in which identical measurement data and the like may be consecutively transmitted.

The second embodiment of the present invention will be described next with reference to FIGS. 5 and 6. Note that since the system configuration and the data format in this embodiment are the same as those described with reference to FIGS. 1 and 2, a description thereof will be omitted. The processing in the second embodiment differs from that in the first embodiment in that system-A and system-B communication abnormality detection processing and associated processing are added to reception processing, and pieces of identification information indicating received data and pieces of corresponding reception time information are stored in the system-A and system-B reception queues in the node on the reception side to perform abnormality detection.

Data transmission from a node 10 to a node 20 in the second embodiment will be described below. First of all, a control section 16 of the node 10 on the transmission side starts the transmission processing shown in FIG. 3 in accordance with a transmission command from an upper application 17. This transmission processing is the same as that described above, and hence a description thereof will be omitted. With this transmission processing, transmission data from the upper application 17 are concurrently transmitted from the node 10 to both a system-A communication line 1 and a system-B communication line 2.

Figure 5:
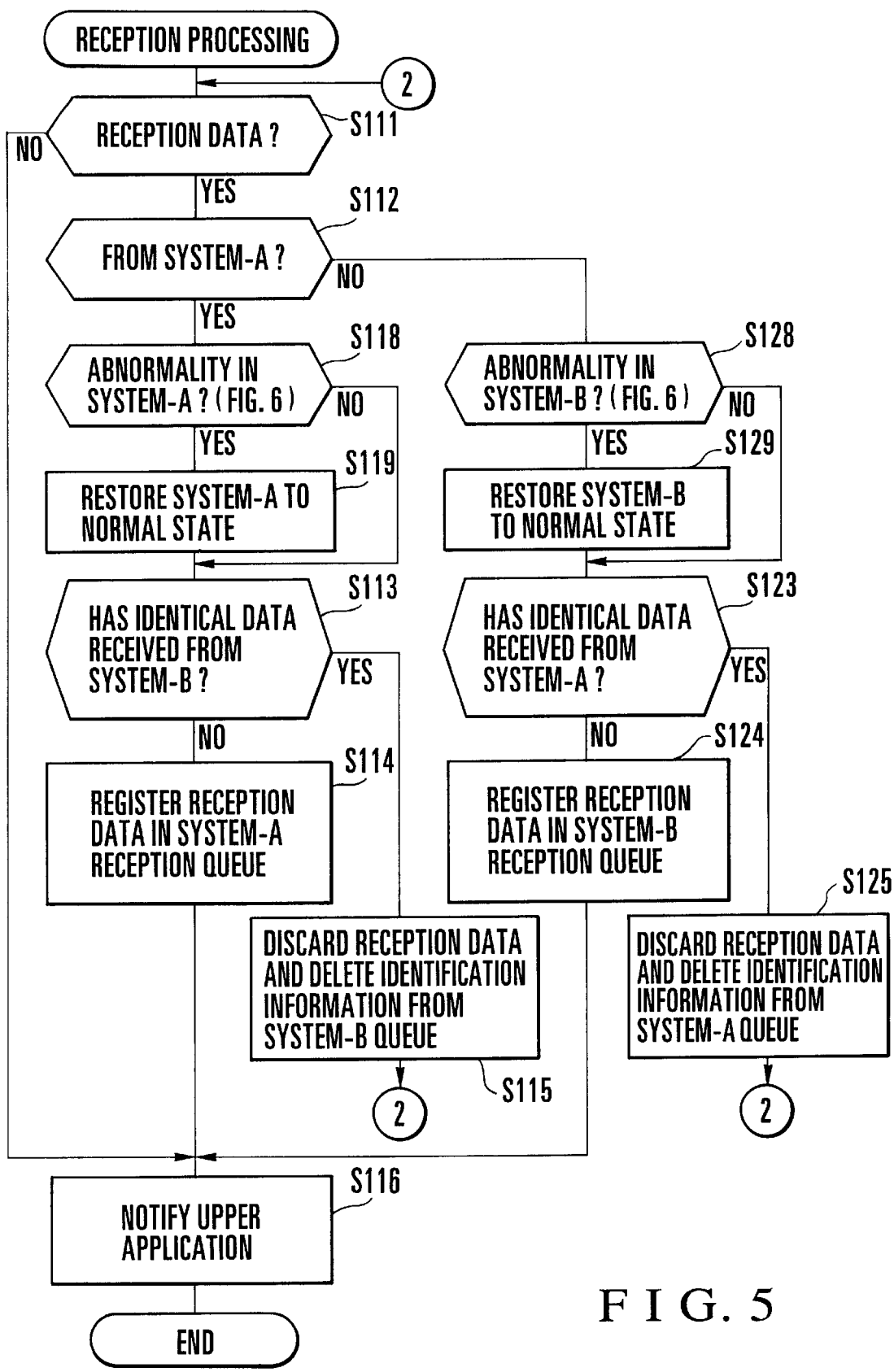
FIG. 5 is a flow chart showing reception processing in a distributed control system using Ethernet communication according to the second embodiment of the present invention.
Figure 6:
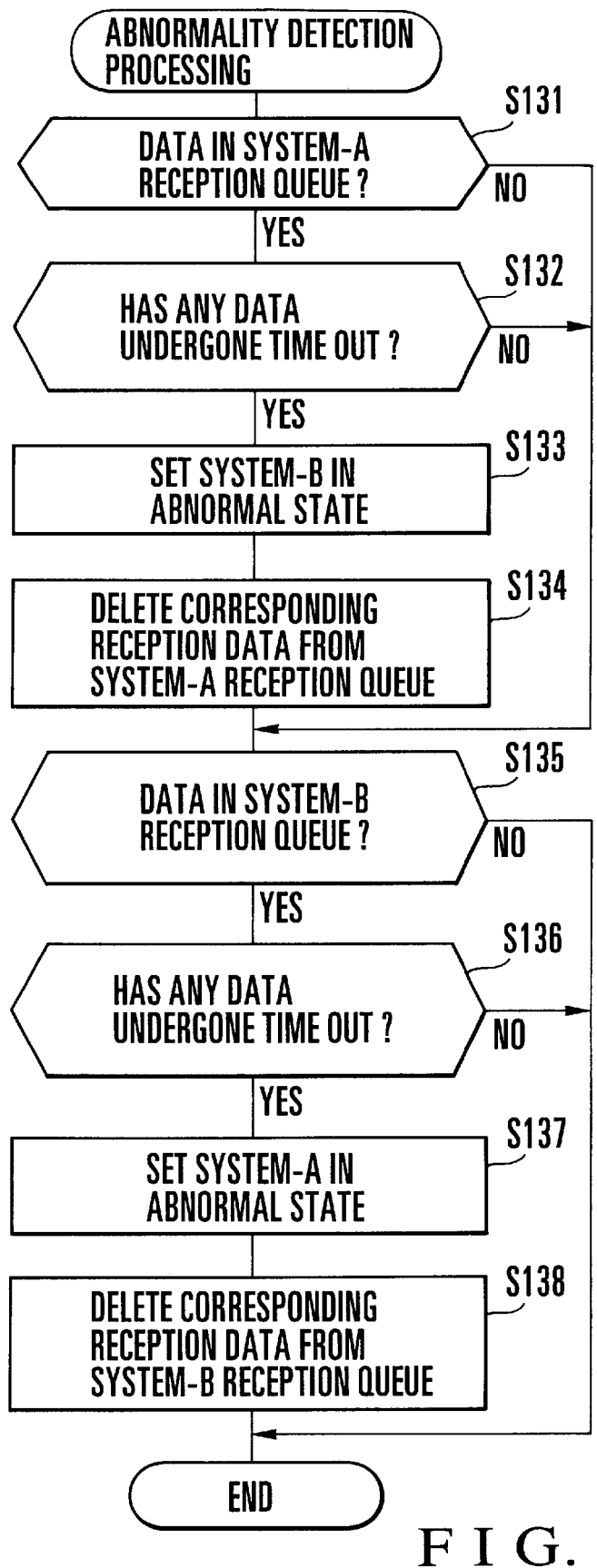
FIG. 6 is a flow chart showing abnormality detection processing in the system according to the second embodiment of the present invention.

A control section 26 of the node 20 on the reception side starts the reception processing shown in FIG. 5 in accordance with a reception command from a an upper application 27. Note that the same step numbers in FIG. 5 denote the same steps as in FIG. 4, and a description thereof will be omitted.

If it is determined in step S112 that reception data has been stored in a reception area corresponding to a system-A device 21, i.e., reception data has been received from the system-A communication line 1, the control section 26 checks whether the system A is set in an abnormal communication state (step S118). Detection of a communication abnormality in each system is periodically executed by the abnormality detection processing shown in FIG. 6 independently of transmission processing and reception processing.

If it is determined in step S118 that the system A is set in the abnormal communication state, since new data has been normally received, the control section 26 determines that the communication state is normal, and restores the communication state of the system A to the normal state (step S119). The control section 26 then checks whether data identical to the reception data from the system A has been received from the system-B communication line 2 (step S113). If it is determined in step S118 that the communication state is normal, the flow also advances to step S113.

Pieces of identification information indicating received data, e.g., data identifiers 7 shown in FIG. 2 added to transmission data when they are transmitted, and pieces of corresponding reception time information are stored in system-A and system-B reception queues 24 and 25. In step S113, the control section 26 refers to the system-B reception queue 25 to check whether there is identification information indicating data identical to the reception data. If no identical reception data has been received, the control section 26 registers the identification information indicating the reception data in the system-A reception queue 24 (step S114).

If it is determined in step S112 that reception data has been stored in a reception area corresponding to a system-B device 22, i.e., reception data has been received from the system-B communication line 2, the control section 26 checks whether the system B is set in the abnormal communication state (step S128). If the system B is set in the abnormal communication state, since new data has been normally received, the control section 26 determines that the communication state is normal, and restores the communication state of the system B to the normal state (step S129).

The control section 26 then checks whether data identical to the reception data has been received from the system-A communication line 1 (step S123). If it is determined in step S128 that the communication state of the system B is normal, the flow also advances to step S123.

The control section 26 of the node 20 periodically executes the abnormality detection processing shown in FIG. 6 independently of the reception processing described with reference to FIG. 5.

First of all, the control section 26 checks whether reception data is registered in the system-A reception queue 24 (step S131). If any reception data are registered, the reception times of all the registered reception data are compared with the current time to check whether any reception data has undergone a predetermined timeout after the reception time (step S132).

If any reception data has undergone the predetermined timeout after the reception time, the control section 26 determines that data identical to the reception data in the system A has not received in the system B after the lapse of the timeout period, and reception abnormality has occurred in the system B, and sets the system B in the abnormal communication state (step S133). The control section 26 then deletes information about the reception data having undergone the timeout from the system-A reception queue 24 (step S134).

Subsequently, in steps S135 to S138, abnormality detection processing for the system B is executed in the same manner as the abnormality detection processing for the system A in steps S131 to S134.

According to this embodiment, the pieces of identification information and received data and the pieces of corresponding reception time information are registered in the system-A reception queue 24 and the system-B reception queue 25. When a timeout occurs in One system after the reception of data, and no data is received in the other system, it is determined that communication abnormality has occurred in the other system, and the information registered in the reception queue is deleted. With this operation, the occurrence of communication abnormality can be accurately determined. In addition, even if communication abnormality occurs in the other system, and reception of identical data cannot be checked, the reception queue in the normal system does not overflow, and reception processing for subsequent data can be accurately performed.

When new data is received from a system in the abnormal communication state, the communication state of this system is restored to the normal state. Even if, therefore, communication abnormality occurs accidentally or temporarily, the communication state of the system can be automatically restored to the normal state, thereby greatly reducing the maintenance load required to restore from the abnormal state.

As has been described above, according to the present invention, variations in the time required for communication due to collisions and the like can be reduced, and measurement data and control commands can be exchanged without any great delay as compared with a system using one Ethernet communication line as a communication system.

In addition, since it is checked on the basis of a data identifier added to reception data on the node on the transmission side whether the reception data is the first received data, the reception of identical data can be easily determined. Therefore, this system can also be used for process control in which identical measurement data and the like may be consecutively transmitted.

Furthermore, since the timeout of reception data is monitored to check the occurrence of communication abnormality in one of Ethernet communication lines, the occurrence of communication abnormality can be accurately determined. In addition, reception processing for subsequent data can be accurately executed.

Moreover, the communication state of an Ethernet communication line is restored to the normal state in accordance with the reception state. Even if, therefore, communication abnormality occurs accidentally or temporarily, the communication state of the system can be automatically restored to the normal state, thereby greatly reducing the maintenance load required to restore from the abnormal state.

What is claimed is:

1. A redundancy method for Ethernet communication between a plurality of nodes constituting a distributed control system, comprising the steps of:

connecting each node of said plurality of nodes to each other in a duplex state through a first and a second Ethernet communication line, wherein said first Ethernet communication line and said second Ethernet communication line are independent of each other;

transmitting identical data from a node on a transmission side through each of said first and said second Ethernet communication lines;

receiving said identical data at a node on a receiving side through each of said first and said second Ethernet communication lines; and selecting which one of the identical data received at a node on said receiving side from said node on said transmission side through said first and said second Ethernet communication lines has arrived first as reception data;

adding a data identifier to each of said identical data for identifying data to be transmitted as data transmitted on one of said first Ethernet communication line and said second Ethernet communication line, and said selecting step further comprises checking on the basis of said data identifier added to each of said identical data transmitted from said node on said transmission side to said node on said receiving side whether said data from said node on said transmission side is data that has arrived at said node on said receiving side first through one of said first Ethernet communication line and said second Ethernet communication line.

2. The method of claim 1, wherein said determining step further comprises temporarily storing said identical data transmitted through said first and said second Ethernet communication lines, wherein said identical data transmitted through said first and said second Ethernet communication lines is independantly received at said node on said receiving side; and storing said data identifier of said received reception data as received on said first and said second Ethernet communication lines; and if said data identifier of said data transmitted through said first Ethernet communication line does not match said data identifier of said data transmitted through said second Ethernet communication line, determining that the temporarily stored said identical data is said reception data.

3. The method of claim 2, further comprising the steps of:

storing reception time information of said reception data as received on said first and said second Ethernet communication lines;

deleting said data identifier and said reception time information from stored data received on said first Ethernet communication line if said data identifier of said identical data transmitted through said second Ethernet communication line matches said identical data transmitted through said first Ethernet communication line;

deleting said data identifier and said reception time information from stored reception data transmitted on said first Ethernet communication line if said data identifier stored from data transmitted on said first Ethernet communication line has undergone a lapse of a predetermined time after a reception time of said stored data.

4. The method of claim 3, further comprising the steps of:

setting said second Ethernet communication line in an abnormal communication state if said predetermined time has elapsed and restoring said second Ethernet communication line to a normal communication state if data is normally received through said second Ethernet communication line set in an abnormal communication state.

5. The method of claim 3, further comprising the step of:

deleting said temporarily stored identical data transmitted through said second Ethernet communication line if a stored data identifier of said identical data transmitted through said second Ethernet communication line matches a data identifier of said identical data transmitted through said first Ethernet communication line.

6. A redundancy method for Ethernet communication between a plurality of nodes constituting a distributed control system, comprising the steps of:

connecting each node of said plurality of nodes to each other in a duplex state through a first and a second Ethernet communication line, wherein said first Ethernet communication line and said second Ethernet communication line are independent of each other;

transmitting identical data from a node on a transmission side through each of said first and said second Ethernet communication lines;

receiving said identical data at a node on a receiving side through each of said first and said second Ethernet communication lines; and selecting which one of the identical data received at a node on said receiving side from said node on said transmission side through said first and said second Ethernet communication lines has arrived first as reception data;

storing reception time data from said identical data transmitted through said first and said second Ethernet communication lines; and if data identical to said data received through said first Ethernet communication line is not received through said second Ethernet communication line, even if a predetermined time has elapsed after a reception time of said data received through said first Ethernet communication line, determining that said second Ethernet communication line is in an abnormal state, and deleting said reception time information of said matched data stored from said transmitted data through said first Ethernet communication line.

\* \* \* \* \*